(12) United States Patent
Li et al.

(10) Patent No.: US 9,160,694 B2
(45) Date of Patent: Oct. 13, 2015

(54) EMAIL MANAGEMENT METHOD, APPARATUS AND TERMINAL DEVICE

(75) Inventors: Yan Li, Beijing (CN); Xuelian Li, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 334 days.

(21) Appl. No.: 13/511,457

(22) PCT Filed: Nov. 24, 2010

(86) PCT No.: PCT/CN2010/079069
§ 371 (c)(1),
(2), (4) Date: May 23, 2012

(87) PCT Pub. No.: WO2011/063745
PCT Pub. Date: Jun. 3, 2011

(65) Prior Publication Data
US 2012/0303729 A1     Nov. 29, 2012

(30) Foreign Application Priority Data
Nov. 25, 2009   (CN) .......................... 2009 1 0241229

(51) Int. Cl.
    *H04L 12/58*   (2006.01)
(52) U.S. Cl.
    CPC ..................................... *H04L 51/08* (2013.01)
(58) Field of Classification Search
    CPC ..................................................... H04L 51/08
    USPC .......................................................... 709/206
    See application file for complete search history.

(56) References Cited

U.S. PATENT DOCUMENTS

| 2004/0068545 | A1* | 4/2004 | Daniell et al. ................ 709/206 |
| 2007/0233792 | A1* | 10/2007 | Sylthe et al. .................. 709/206 |
| 2009/0177754 | A1* | 7/2009 | Brezina et al. ................ 709/206 |

FOREIGN PATENT DOCUMENTS

| CN | 1889106 | * | 6/2005 |
| CN | 1889106 | | 1/2007 |
| CN | 101080054 | | 11/2007 |
| JP | 2007122125 | A * | 5/2007 |

OTHER PUBLICATIONS

PCT/CN2010/079069 International Preliminary Report on Patentability dated May 20, 2012 (5 pages).
PCT/CN2010/079069 International Search Report dated Feb. 11, 2011 (2 pages).

(Continued)

*Primary Examiner* — Michael C Lai
(74) *Attorney, Agent, or Firm* — Brinks Gilson & Lione; G. Peter Nichols

(57) ABSTRACT

The present invention provides an email management method, apparatus and terminal device, wherein the method comprises: receiving an email, and judging whether said email is attached with an attachment; if said email is attached with an attachment, extracting attachment information of said email, and saving said attachment information. The solution of the present invention improves the efficiency of email searching, and makes it more convenient for the user to perform searching.

6 Claims, 3 Drawing Sheets

(56) References Cited

OTHER PUBLICATIONS

First Office Action dated Apr. 18, 2012 from Chinese priority application 200910241229.3 (14 pages including English translation).

Second Office Action dated Jan. 18, 2013 from Chinese priority application 200910241229.3 (15 pages including English translation).

Rejection Decision dated Aug. 8, 2013 from Chinese priority application 200910241229.3 (18 pages including English translation).

* cited by examiner

EMAIL MANAGEMENT METHOD, APPARATUS AND TERMINAL DEVICE

BACKGROUND

The present invention relates to an email management technology, and specially, refers to an email management method, apparatus and terminal device.

Most of the businessmen in modern society receive a large number of emails (such as hundreds of emails) at work every day. However, in the existing email receiving and management system (e.g., the Outlook or email management modules of mobile terminal devices like mobile phones that receive and manage emails), most users physically save emails in disk storages of computers or mobile terminals after receiving the emails. Especially for the emails with attachments, files of the attachments are physically saved in the storage disk as well. In this way, excessive files are saved in the disk storages. As the time passes by, the users can't remember clearly the location where the files are saved, and they usually cannot find the needed files that are received. When a user need to check the attachment file(s) of a certain email, the files received or sent earlier are searched for by the email management system. While searching, it may be needed to input necessary keywords, such as sender, receiving time and so on, in the searching field of the email management system. The email management system needs to search in a relatively large range, which makes the user need to wait a very long time for data searching and thus makes the searching efficiency relatively low.

In the process of implementing the present invention, the inventor finds that there are at least the following problems in the prior art:

The efficiency of email searching is low and the searching is not convenient in the existing email management system.

SUMMARY

The technical problem to be solved by the present invention is to provide an email management method, apparatus and terminal device which make the efficiency of email searching higher and make email attachment browsing more convenient.

In order to solve the above mentioned technical problem, embodiments of the present invention provide following technical solutions:

In one aspect, there is provided an email management method, comprising:

receiving an email, and judging whether said email is attached with an attachment;

if said email is attached with an attachment, extracting attachment information of said email, and saving said attachment information.

Preferably, said attachment information comprises: attachment content and/or attachment attribute information; wherein, said attachment content refers to an attachment file in the email;

said attachment attribute information comprises sender information, sending time of the email to which said attachment belongs, the size of said attachment file, the name of said attachment file and/or type information of said attachment file.

Preferably, said step of saving said attachment information is particularly:

physically saving said attachment content in a special storage space automatically.

Preferably, after said step of physically saving said attachment content in a special storage space automatically, it further comprises:

when said attachment content is manually re-saved in a specified storage space, deleting said attachment content physically saved in said special storage space automatically, and at the same time, saving address link information of said specified storage space in said special storage space.

Preferably, after said step of physically saving said attachment content in a special storage space automatically, it further comprises:

if the name and type of the attachment file received later are the same with the name and type of the attachment file already saved earlier, automatically modifying the name of said attachment file received later, and then saving said attachment file received later with the modified name of the attachment file.

Preferably, said step of saving said attachment information is particularly:

automatically saving said attachment attribute information in a special storage directory.

Preferably, before said step of automatically saving said attachment information in a special storage directory, it further comprises:

saving the text and the attachment content of the received email together in a database of emails; or saving the attachment content of the received email in a special storage space.

Preferably, after said step of automatically saving said attachment attribute information in a special storage directory, it further comprises:

saving the attachment content, which is already checked according to the attachment attribute information in said special storage directory, in a cache memory where said special storage directory is located, so that when the attachment content is checked next time, it is read directly from said cache memory.

In another aspect, the embodiments of the present invention also provide an email management apparatus, comprising:

a judging module for judging whether a received email is attached with an attachment;

a processing module for extracting attachment information of said email, and saving said attachment information, when said email is attached with an attachment.

Preferably, the above mentioned email management apparatus further comprises:

a displaying module for displaying said attachment information in the form of directories.

Preferably, said processing module comprises:

a first processing sub-module for extracting attachment content of said email when said email is attached with an attachment, and physically saving said attachment content in a special storage space automatically; and/or a second processing sub-module for extracting attachment attribute information of said email when said email is attached with an attachment, and automatically saving said attachment attribute information in a special storage directory.

In still another aspect, the embodiments of the present invention also provide a terminal device, comprising:

a receiving module for receiving an email;

a judging module for judging whether the email received by said receiving module is attached with an attachment;

a processing module for extracting attachment information of said email, and saving said attachment information, when said judging module judges that said email is attached with an attachment;

a displaying module for displaying said attachment information in the form of directories.

The embodiments of the present invention have the following beneficial effects:

The above mentioned solutions make it more convenient for the user to read and manage collectively by automatically identifying whether an email is attached with an attachment and the type of the attachment, automatically saving the attachment information in one special directory (a special file folder or a special storage directory), and directly presenting the attachment content in a visual organization manner. Thus, the user doesn't have to input any keyword to search attachments. With the solutions of the present invention, the attachment that the user needs can be found rapidly, thus the efficiency of email attachment searching is improved, it becomes more convenient for the user to perform searching.

DETAILED DESCRIPTION

In order to make the technical problem to be solved, technical solution and advantage of the embodiments of the present invention clearer, the present invention will be described in detail below in connection with the accompanying drawings and the particular embodiments.

The embodiments of the present invention aim at the problem that the efficiency of email searching is low and the searching is not convenient in the existing email management system, and provide an email management method, apparatus and terminal device which make the efficiency of email searching higher and make email attachment searching more convenient.

Figure 1:
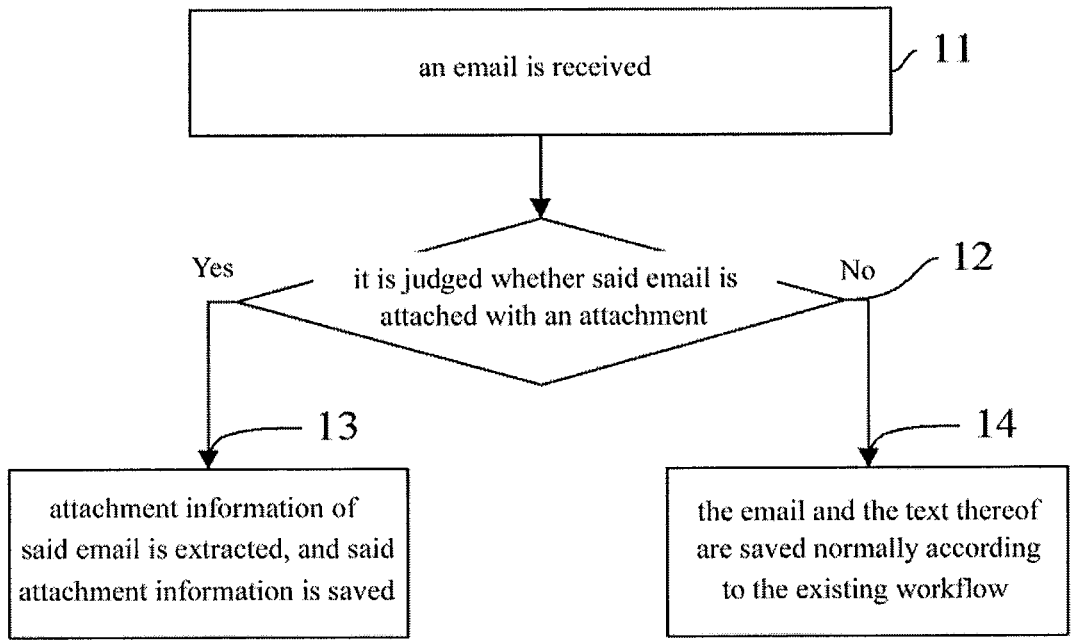
FIG. 1 is the workflow diagram of the email management method of the present invention.

As shown in FIG. 1, an email management method according to an embodiment of the present invention includes:

In step 11, an email is received;

In step 12, it is judged whether said email is attached with an attachment. During the particular implementation, an attachment field of the email can be judged in a database of emails. If the content of the field is "attached with", it means this email is an email attached with an attachment, otherwise, it is an email attached without any attachment;

In step 13, if said email is attached with an attachment, attachment information of said email is extracted, and said attachment information is saved.

It can also be included in this method:

In step 14, if said email is not attached with any attachment, the received email and the text of this email are saved normally according to the existing workflow.

Wherein, the attachment information in the above mentioned method includes attachment content and/or attachment attribute information. Wherein, said attachment content refers to an attachment file in the email, and said attachment attribute information includes sender information, sending time of the email to which said attachment belongs, the size of said attachment file, the name of said attachment file and/or type information of said attachment file.

Figure 2:
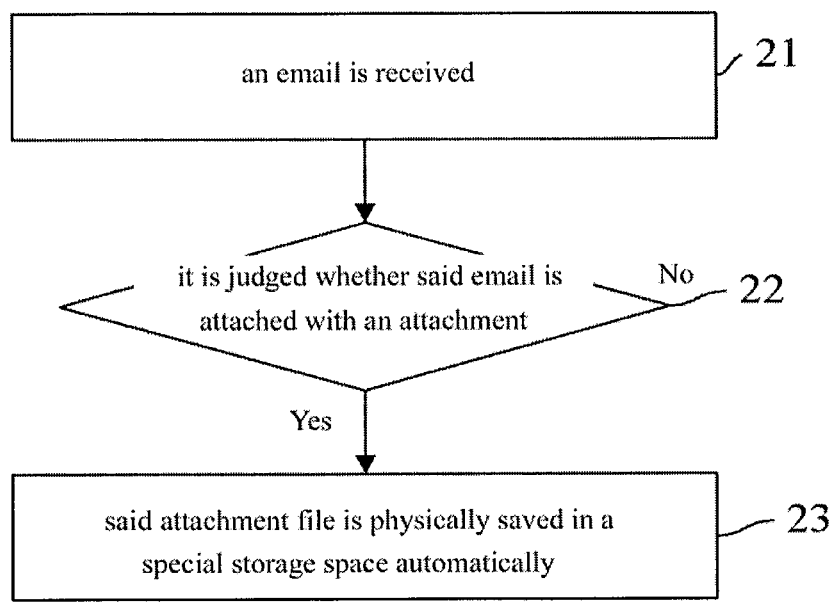
FIG. 2 is the workflow diagram of a particular embodiment of the method shown in FIG. 1.

As shown in FIG. 2, when said attachment information which is saved is an attachment file, the method includes particularly:

In step 21, an email is received;

In step 22, it is judged whether said email is attached with an attachment;

In step 23, if yes, said attachment file is physically saved in a special storage space automatically.

Wherein, this special storage space can be one special file folder preset by the system. This special file folder preset by the system is used for saving attachment files of emails, is visible to the user, and allows the user to be able to modify the saving path of this file folder by himself or herself. During the particular implementation, the attachment files of these emails are managed by a specific attachment management application in the email management system. The content of these attachment files is presented in a visual manner to make it easier for the user to browse. With this attachment management application, the user can perform management operations, such as various operations like renaming, deleting, prioritizing and/or labeling the attachment files, to the attachment files therein.

Preferably, after the above mentioned step 23, the method can further include:

In step 24, after the email is received, when it is judged that this email is an email attached with attachment and said attachment content is manually re-saved in a specified storage space by the user, said attachment content physically saved in said special storage space automatically is deleted. At the same time, address link information is generated, which points to the location in said specified storage space or said specified storage space where said attachment content manually saved by the user is stored. And, said address link information is saved in said special storage space, so that this specified storage space can be accessed via this address link information, or this attachment content can be read at the preset location of this specified storage space via this address link information.

In addition, after the above mentioned step 23 or step 24, the method can further include:

If the name of the attachment file received later is the same with the name of the attachment file already saved earlier, and if the type of this attachment file received later is also the same with the type of the attachment file already saved earlier, the name of the attachment file received later is automatically modified, and then said attachment file received later is saved with the modified name of the attachment file, so that the attachment content that the user checks is the attachment file that is saved most lately.

Figure 3:
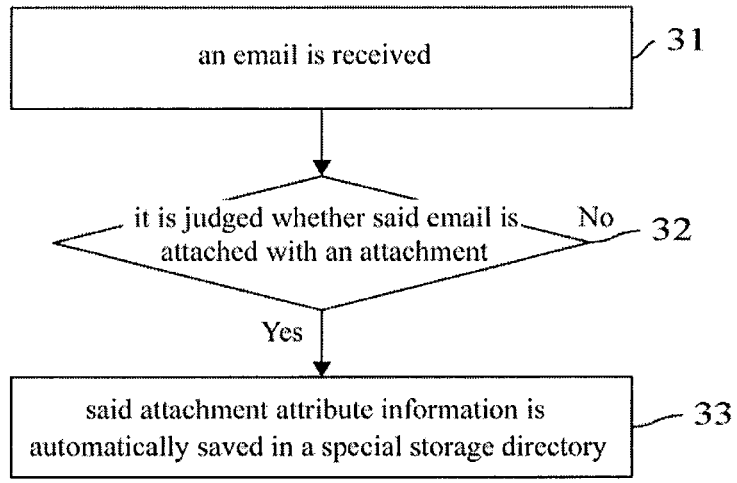
FIG. 3 is the workflow diagram of another particular embodiment of the method shown in FIG. 1.

As shown in FIG. 3, when the saved attachment information is attachment attribute information, said attachment attribute information includes sender information, sending time of the email to which said attachment belongs, the size of said attachment file, the name of said attachment file and/or type information of said attachment file. The particular implementation workflow of this method includes:

In step 31, an email is received;

In step 32, it is judged whether this email is attached with an attachment;

In step 33, if it is attached with an attachment, said attachment attribute information is automatically saved in a special storage directory.

This special storage directory is saved in a cache memory, and is invisible to the user. The system manages this special storage directory. For instance, when the upper limit of the storage of this cache memory is exceeded, the system will clean up this special storage directory and release the memory space according to a predetermined mechanism. For example, the system can clean up said attachment attribute information having the earliest time, or the system can also clean up said attachment attribute information having the least number of time of accessing.

Preferably, before saving the attachment attribute information, the above mentioned step 33 can further include:

The text and the attachment content of the received email are saved together in the email database, that is to say, before the user opens the attachment file, the attachment file may not be saved locally, and instead this attachment file is saved in the email database of the email server. Alternatively, according to the manner of the above mentioned embodiment shown in FIG. 2, the attachment content of the received email is saved in a special storage space, and there is a one-to-one mapping relationship between the attachment file in the special storage space and the attachment attribute information. For instance, the attachment file corresponding to the attachment attribute information can be read via the attachment attribute information.

In this embodiment, when the user locally opens the attachment file according to the saved attachment information, the attachment file will be saved locally, but the saving address is invisible to the user. The system can delete the attachment file saved locally in accordance with its own requirement. For the user, it is only necessary for him or her to care for the attachment information and then to open the attachment file as needed, without having to know where the attachment file is saved. Obviously, in this embodiment, the attachment file and the email information can be saved together locally.

During the particular implementation, there is a specific attachment management application in the email management system. Whenever launched, the attachment management application examines the email database or the special storage space that saves the attachment file in the above mentioned embodiment shown in FIG. 2, and extracts the attachment attribute information of the email attached with attachment files for displaying. The user can open a certain particular attachment file in the attachment management application. This attachment file would be saved in a cache memory, which can be the same cache memory as the cache memory where the above mentioned special storage directory is located, and which can also be a cache memory commonly used by both the attachment management application and the normal email receiving and sending module.

Preferably, after automatically saving the attachment attribute information or saving the attachment content corresponding to the attachment attribute information, the above mentioned Step 33 can further include:

The attachment content which is already checked according to the attachment attribute information in said special storage directory or the attachment content that is opened directly by clicking in the received single email is saved in the cache memory where said special storage directory is located, so that when this attachment content is checked next time, it is read directly from said cache memory.

Specially for some hand-held devices with slower download speed or reading speed, the speed of reading emails would be greatly improved when emails are received and read using this method. While looking up for emails, this operation is done by directly searching in these attachment attribute information, without inputting any keywords. Thus, the searching efficiency is substantially improved, and it is more convenient for the user to perform searching. The same effect can also be achieved for terminal devices with faster network speed such as computers.

In addition, the user can also manually release the cache memory space of this special storage directory in the attachment management application.

To sum up, the email management system according to the present invention can automatically identify whether an email is attached with an attachment and the type of the attachment, automatically save the attachment information in one special directory (a special file folder or a special storage directory), and directly present the attachment content in a visual organization manner, so as to make it more convenient for the user to read and manage collectively. Thus, the user doesn't have to specifically save the attachment of an single email, or to memorize the saving path of the attachment file, or to seek in file folders one layer after another and open the file folders one-by-one. Rather, the user can quickly preview all the latest attachments, sort and screen the attachment contents according to the file types of the attachments, find the attachment file that he or she needs rapidly, thus making searching more convenient.

Figure 4:
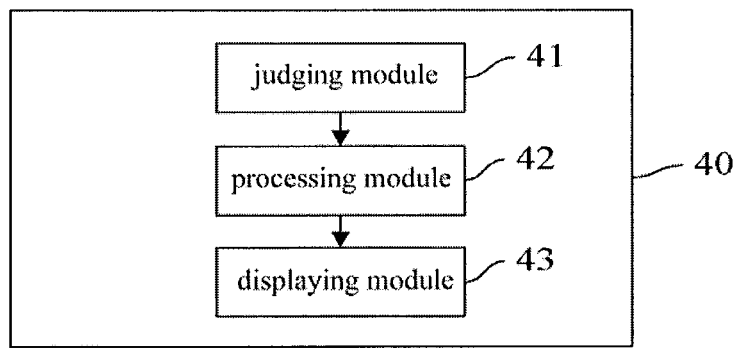
FIG. 4 is the structure diagram of the email management apparatus of the present invention.

As shown in FIG. 4, the embodiment of the present invention also provides an email management apparatus 40, which includes:

A judging module 41, which is used for judging whether a received email is attached with an attachment. During the particular implementation, an attachment field of the email can be judged in a database of emails. If the content of the field is "attached with", it means this email is an email attached with an attachment, otherwise, it is an email attached without any attachment;

A processing module 42, which is used for extracting attachment information of said email, and saving said attachment information, when said email is attached with an attachment.

Preferably, the apparatus 40 can further include:

A displaying module 43, which is used for displaying said attachment information in the form of directories, so as to make it more convenient for the user to check the received attachment information.

Figure 5:
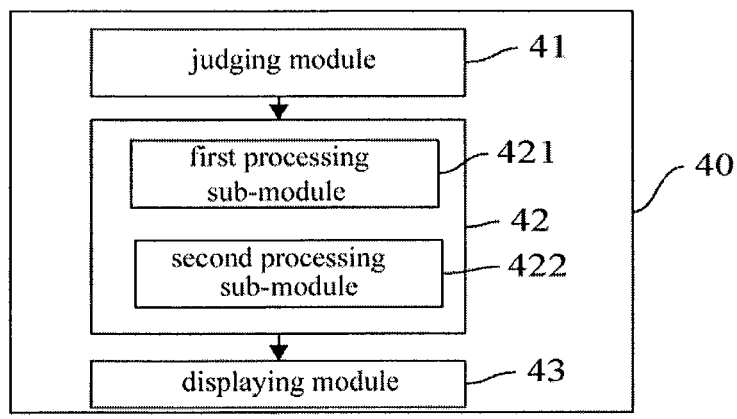
FIG. 5 is the structure diagram of a particular embodiment of the apparatus shown in FIG. 4.

Wherein, as shown in FIG. 5, based on the above mentioned embodiment shown in FIG. 4, said processing module 42 includes:

A first processing sub-module 421, which is used for extracting attachment content of said email when said email is attached with an attachment, and physically saving said attachment content in a special storage space automatically. The particular implementation workflow of the first processing sub-module 421 is like the workflow of the above mentioned method shown in FIG. 2, which is not elaborated again herein;

and/or

Figure 6:
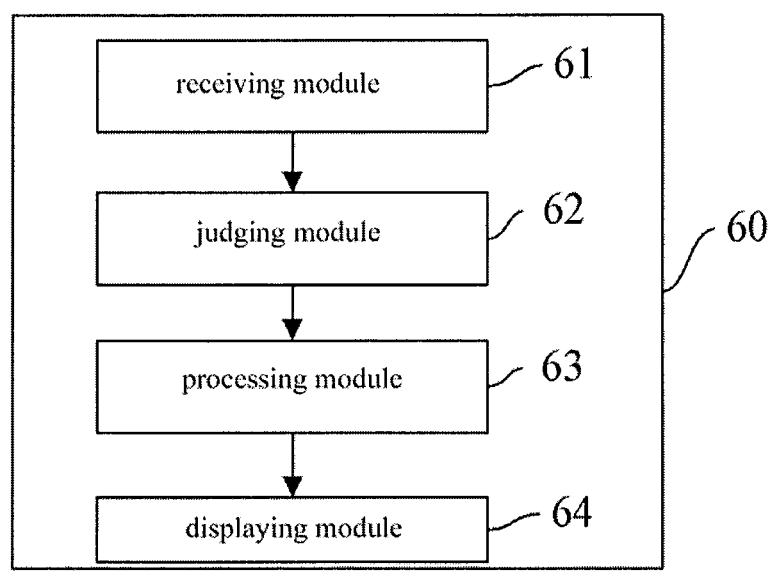
FIG. 6 is the structure diagram of the terminal device of the present invention.

A second processing sub-module 422, which is used for extracting attachment attribute information of said email when said email is attached with an attachment, and automatically saving said attachment attribute information in a special storage directory. The particular implementation workflow of the second processing sub-module 422 is like the workflow of the above mentioned method shown in FIG. 3, which is not elaborated again herein;

It needs to be noted that the apparatus 40 can be installed either in such an email receiving and sending apparatus having stronger functions as a computer, or in an email receiving and sending apparatus such as a hand-held device. As shown in FIG. 6, the embodiment of the present invention also provides a terminal device 60, which includes:

A receiving module 61 which is used for receiving an email;

A judging module 62, which is used for judging whether the email received by said receiving module 61 is attached with an attachment;

A processing module 63, which is used for extracting attachment information of said email, and saving said attachment information, when said judging module 62 judges that said email is attached with an attachment;

A displaying module 64, which is used for displaying said attachment information in the form of directories.

Preferably, the above mentioned processing module 63 is the same as the processing module 42 in the embodiment of the apparatus shown in FIG. 4. Similarly, the processing module 63 can also extract attachment content of said email when said email is attached with an attachment, and physically save said attachment content in a special storage space automatically; and/or extract attachment attribute information of said email when said email is attached with an attachment, and automatically save said attachment attribute information in a special storage directory.

It needs to be noted that all the features of the above mentioned method embodiment and apparatus embodiment are applicable to the terminal device 60. The terminal apparatus also has the same technical effects that the above mentioned method embodiment and apparatus embodiment can achieve, which is not elaborated again herein.

If the above mentioned terminal device according to the present invention is a computer, when opening the attachment management application for browsing, the user can directly perform refreshing. The latest attachment content is read and opened directly, and quickly presented to the user, thus simplifying the user's operation and improving the user's experience. Alternatively, When the above mentioned terminal device according to the present invention is a hand-held device, the attachment attribute information, such as related information like the name of the attachment as well as the sender and sending time of the email to which the attachment belongs, would be presented to the user first, and then the user only opens the most urgent or most needed attachment content by his/her judgment, thus improving the speed and saving the cost. Moreover, when searching for attachments based on the above mentioned method and apparatus, the attachment information can be immediately browsed by directly clicking the attachment management application without inputting any keyword to perform searching. Thus, it provides sufficient condition to improve searching efficiency for the user to search for attachments, and makes it more convenient for the user to search.

The above mentioned is the preferred mode for carrying out the invention. It should be pointed out that, for those having ordinary skills in this technical field, on the condition of not deviating from the principle mentioned in the present invention, several improvements and refinements can be made as well, which should be also treated as the scope protected by the present invention.

What is claimed is:

1. An email management method, comprising:
   receiving an email, and judging whether the email is attached with an attachment;
   if the email is attached with an attachment, extracting attachment information of the email, and saving the attachment information,
   wherein the attachment information comprises: attachment content and attachment attribute information; wherein, the attachment content refers to an attachment file in the email; and the attachment attribute information comprises sender information, sending time of the email to which the attachment belongs, size of the attachment file, name of the attachment file and/or type information of the attachment file; and,
   wherein the step of saving the attachment information includes automatically saving the attachment attribute information in a special storage directory that is invisible to a user and automatically physically saving the attachment content in a special storage space, wherein, after the step of automatically physically saving the attachment content in a special storage space, the email management method further comprises:
   manually re-saving the attachment content in a specified storage space, deleting the attachment content automatically physically saved in the special storage space, generating address link information which points to the location in the specified storage space or the specified storage space where the attachment content manually saved by the user is stored; and saving the address link information of the specified storage space in the special storage space.

2. The email management method of claim 1, wherein, the attachment attribute information comprises at least the name of the attachment file and type information of the attachment file and after the step of physically saving the attachment content in a special storage space automatically, the email management method further comprises:
   if the name and type information of the attachment file received later are the same with the name and type information of the attachment file already saved earlier, automatically modifying the name of the attachment file received later, and then saving the attachment file received later with the modified name of the attachment file.

3. The email management method of claim 1, wherein, before the step of automatically saving the attachment information in a special storage directory, the email management method further comprises:
   saving text and the attachment content of the received email together in a database of emails; or
   saving the attachment content of the received email in a special storage space.

4. The email management method of claim 1, wherein after the step of automatically saving the attachment attribute information in a special storage directory, the email management method further comprises:
   saving the attachment content, which is already checked according to the attachment attribute information in the special storage directory, in a cache memory where the special storage directory is located, so that when the attachment content is checked next time, the attachment content is read directly from the cache memory.

5. An email management apparatus, comprising:
   a judging module for judging whether a received email is attached with an attachment;
   a processing module for extracting attachment information of the email, and saving the attachment information, when the email is attached with an attachment; and,
   a displaying module for displaying the attachment information in the form of directories, wherein the attachment information includes attachment content and attachment attribute information; wherein the attachment content refers to an attachment file in the email, and the attachment attribute information includes sender information, sending time of the email to which the attachment belongs, size of the attachment file, name of the attachment file and/or type of the attachment file, wherein the processing module includes a first processing sub-module to extract attachment attribute information of the email when the email is attached with an attachment, and to automatically save the attachment attribute information in a special storage directory that is invisible to a user, and a second processing sub-module for extracting attachment content of the email when the email is attached with an attachment, and automatically physically saving the attachment content in a special storage space, wherein the attachment content is manually re-saved in a specified storage space, the second processing sub-module deletes the attachment content automatically physically saved in the special storage space, generates address link information which points to the location in the specified storage space or the specified storage space where the attachment content manually saved by the user is stored, and saves the address link information of the specified storage space in the special storage space.

6. A terminal device, comprising:

a receiving module for receiving an email;

a judging module for judging whether the email received by the receiving module is attached with an attachment;

a processing module for extracting attachment information of the email, and saving the attachment information, when the judging module judges that the email is attached with an attachment;

a displaying module for displaying the attachment information in the form of directories;

wherein the attachment information includes attachment content and attachment attribute information wherein the attachment content refers to an attachment file in the email and the attachment attribute information includes sender information, sending time of the email to which the attachment belongs, size of the attachment file, name of the attachment file and/or type of the attachment file, wherein the processing module includes a first processing sub-module to extract attachment attribute information of the email when the email is attached with an attachment, and to automatically save the attachment attribute information in a special storage directory that is invisible to a user, and a second processing sub-module for extracting attachment content of the email when the email is attached with an attachment, and automatically physically saving the attachment content in a special storage space, wherein the attachment content is manually re-saved in a specified storage space, the second processing sub-module deletes the attachment content automatically physically saved in the special storage space, generates address link information which points to the location in the specified storage space or the specified storage space where the attachment content manually saved by the user is stored, and saves the address link information of the specified storage space in the special storage space.

* * * * *